J. O. ROBERTS.
GUARD OR FENDER FOR VEHICLE WHEELS.
APPLICATION FILED APR. 13, 1909.

941,170.

Patented Nov. 23, 1909.
2 SHEETS—SHEET 1.

WITNESSES
a. w. whiting
M. N. Freeman

INVENTOR
James O. Roberts
By Louis Bogger
his Attorneys

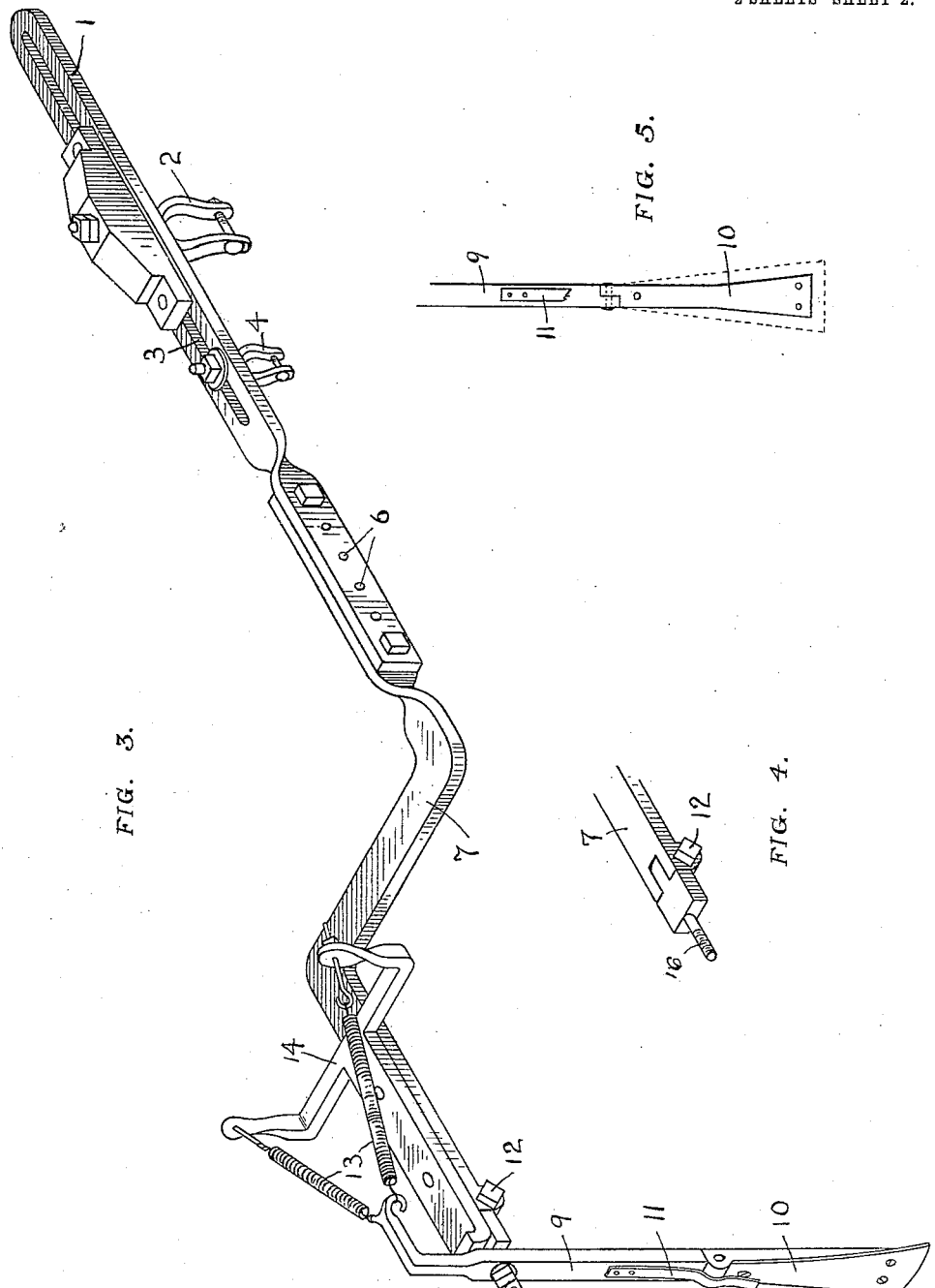

UNITED STATES PATENT OFFICE.

JAMES ORMAN ROBERTS, OF GRANGER, TEXAS.

GUARD OR FENDER FOR VEHICLE-WHEELS.

941,170.  Specification of Letters Patent. Patented Nov. 23, 1909.

Application filed April 13, 1909. Serial No. 489,697.

*To all whom it may concern:*

Be it known that I, JAMES O. ROBERTS, a citizen of the United States, residing at Granger, in the county of Williamson, and State of Texas, have invented certain new and useful Improvements in Guards or Fenders for Vehicle-Wheels, of which the following is a specification.

My invention relates to an improvement in guards or fenders for automobile wheels, and the object is to provide means whereby a fender can be placed in such a position in front of the wheel that any glass or other material which would injure the tire may be brushed or moved out of the path of the wheel.

The invention consists of certain novel features of construction and combination of parts which will be hereinafter fully described and pointed out in the claims.

Figure 1:
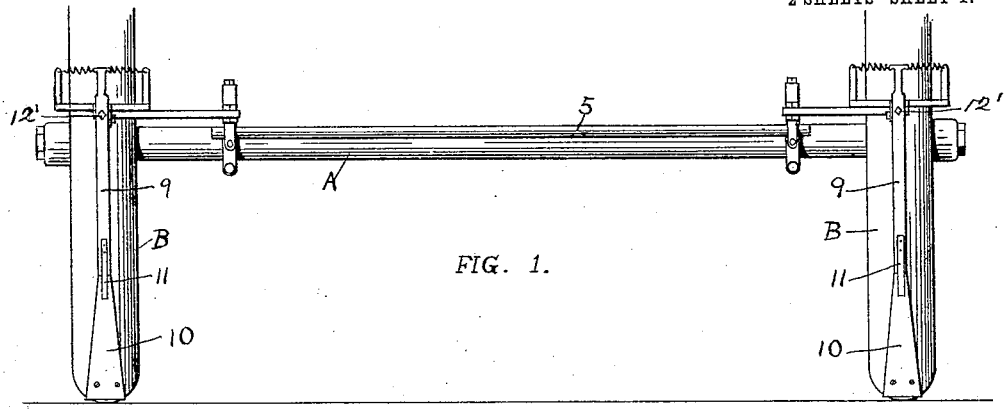
Figure 2:
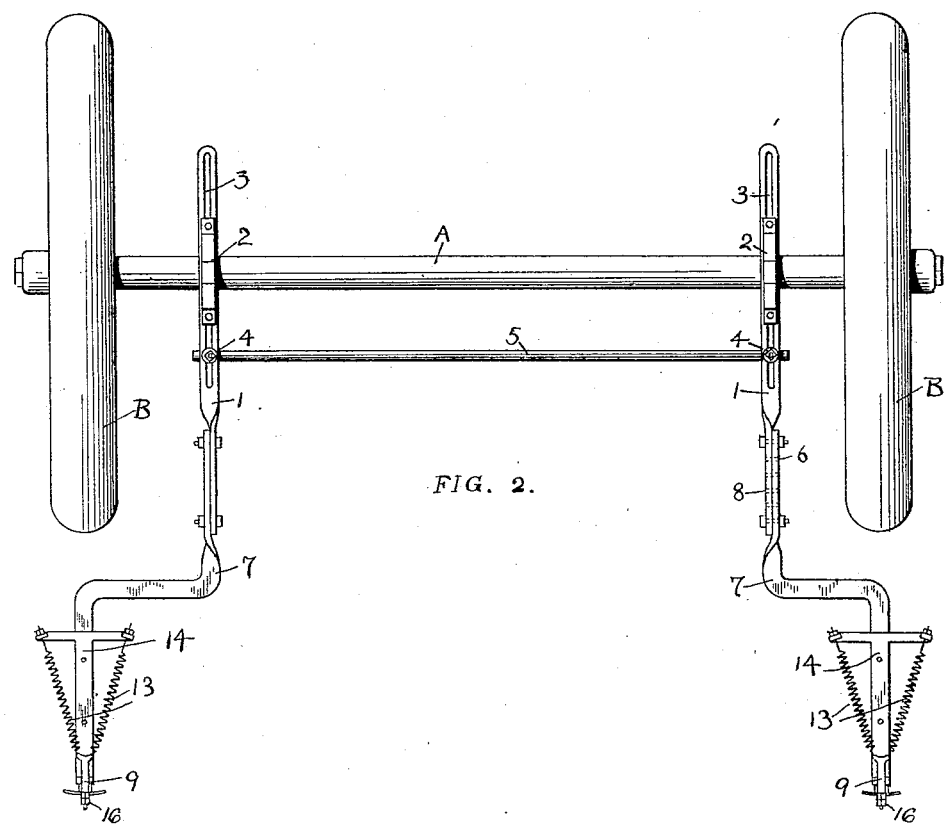

In the accompanying drawings—Figure 1 is a view in front elevation showing my invention applied to the front axle of an automobile; Fig. 2 is a top plan view with the body of the vehicle removed; Fig. 3 is a perspective view of one of the arms, and Figs. 4 and 5 are details.

A represents the axle of an automobile, and B, B are the wheels. Mounted upon the axle are bars 1, 1 connected thereto by clamps 2, 2. The bars have a swinging or oscillating movement with respect to the clamps. The clamps being fastened to the axle, the bars are capable of a swinging movement through the pivotal connection between the clamps and bars. Elongated slots 3 are formed in each bar on each side of the clamp 2, in which is received a clamp 4 similar to the clamp 2. Connected to the clamps 4 is a guide bar 5, which can be connected to the bar either in front or in the rear of the axle, as desired. When it is desired to connect the bar to the rear of the axle the clamps 4 are received in the rear slots. The forward ends of the bars 1 are provided with holes 6 whereby the arms 7, which are provided with similar holes 8, are capable of adjustable connection therewith. The arms 7 have an elbow formed therein, a portion of which elbow extends at right angles to the main portion and another portion extends outwardly on a parallel line with the main portion.

Fender rods 9 are made in two sections which sections are hinged together, the lower section carrying the guard or shoe 10. A spring 11 is mounted on each rod and is adapted to limit the forward movement of the shoe or guard. A hinge 16 is pivotally connected to each arm 7 by a bolt 12 and pivotally mounted on each hinge is one of the rods 9. The rods are allowed an oscillating or swinging movement longitudinally of the arms by means of the hinge bolt 12 and as they are pivotally mounted upon the hinges 16 they are capable of a lateral or horizontal movement of the arms 7. The upper end of the rod is bent at right angles to the main portion, and connected thereto are springs 13, which are connected to a U-shaped bracket 14. The springs extend from the end of each rod to the ends of the brackets to limit the oscillating movement of the rods longitudinally and horizontally of the arms 7.

By providing each rod 9 with the hinged connection 12 the strain which the rod would be subjected to by coming in contact with a rut or obstruction of any kind will permit the rod to be moved toward the wheel, thereby relieving the strain and preventing the rod from breaking. Also by making the rod in two sections and having the two sections connected together, considerable strain is taken up which would naturally come on the hinged connection or hinge bolt 12. For slight obstructions the loose connection between the sections will be all that is necessary, and the springs 11 will limit the movement of the guard or shoe in a forward direction.

The guide bar 5, which is connected to the clamps 4 can be so adjusted with respect to the bars 1 that the lateral oscillating movement of the bars 1 will be very slight. The object in providing the guide bar and permitting the bars 1 to oscillate is to permit the guards or fenders to always be in front of the wheel when turning corners or making a turn. The majority of wheels now used on motor vehicles are provided with a swivel connection between the hub of the wheel and the axle, and it is therefore necessary to make some provision to have the guards in front of the wheels when making turns. By the holes 6 and 8 in the bars 1 and arms 7 the arms 7 can be adjusted for placing the guards at any distance desired in advance of the wheels.

From the foregoing it will be seen that I have provided a fender or guard which will be always in advance and in front of the wheel for removing any glass or other material which would puncture or injure the tire.

It is evident that more or less slight changes might be made in the form and arrangement of the several parts described without departing from the spirit and scope of my invention, and hence I do not wish to be limited to the exact construction herein set forth, but:—

Having fully described my invention, what I claim as new and desire to secure by Letters Patent is:

1. In a guard or fender for vehicle wheels, the combination with a fender, of arms connected thereto, hinges pivotally connected to the arms and guards pivotally connected to the hinges capable of an oscillating movement longitudinally and laterally of the arms.

2. In a guard or fender for vehicle wheels, the combination with a vehicle body, of arms connected thereto, rods made in sections, the sections having a hinged connection therebetween, said rods having a pivotal and oscillating connection with the arms, and shoes on the rods.

3. In a guard or fender for vehicle wheels, the combination with a vehicle body, of an axle, bars movably mounted upon the axle, a guide bar connected to the bars for limiting the movement of the bars, arms connected to the bars, and spring controlled guards connected to the arms.

4. In a guard or fender for vehicle wheels, the combination with a vehicle body, of an axle, bars movably connected to the axle, a guide bar adjustably connected to the bars for regulating the movement of the bars, arms connected to the bars, spring controlled guards having a pivotal and oscillating connection with the arms.

5. In a guard or fender for vehicle wheels, the combination with a vehicle body, of an axle, bars mounted upon the axle capable of horizontal movement thereon, arms connected to the bars, and rods carrying shoes pivotally mounted on the arms.

6. In a guard or fender for vehicle wheels, the combination with a vehicle body, of an axle, bars mounted upon the axle capable of horizontal movement thereon, arms adjustably connected to the bars, and rods carrying shoes pivotally mounted on the arms.

In testimony whereof I affix my signature, in the presence of two witnesses.

JAMES ORMAN ROBERTS.

Witnesses:
   W. A. MILLER,
   WALTER TEER.